(12) United States Patent
Hayashi et al.

(10) Patent No.: US 12,352,898 B2
(45) Date of Patent: Jul. 8, 2025

(54) RANGING DEVICE

(71) Applicant: DENSO CORPORATION, Kariya (JP)

(72) Inventors: Koki Hayashi, Kariya (JP); Kunihiko Hayashi, Kariya (JP); Kouhei Tooyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 881 days.

(21) Appl. No.: 17/643,581

(22) Filed: Dec. 9, 2021

(65) Prior Publication Data

US 2022/0099811 A1 Mar. 31, 2022

Related U.S. Application Data

(63) Continuation of application No. PCT/JP2020/022907, filed on Jun. 10, 2020.

(30) Foreign Application Priority Data

Jun. 11, 2019 (JP) .................................. 2019-108653

(51) Int. Cl.
G02B 26/10 (2006.01)
G01S 7/481 (2006.01)
G01S 17/931 (2020.01)

(52) U.S. Cl.
CPC .......... G01S 7/4817 (2013.01); G01S 7/4814 (2013.01); G01S 7/4816 (2013.01); G01S 17/931 (2020.01); G02B 26/10 (2013.01); G02B 26/105 (2013.01)

(58) Field of Classification Search
CPC .... G02B 26/105; G02B 26/12; G02B 26/121; G02B 26/122; G02B 26/123; G02B 7/1821; G02B 26/0816; G02B 5/09
See application file for complete search history.

(56) References Cited

U.S. PATENT DOCUMENTS

| | | | |
|---|---|---|---|
| 8,629,977 B2 * | 1/2014 | Phillips ................. | G01S 7/4817 356/3.01 |
| 9,964,758 B2 * | 5/2018 | Bayha ................... | G01S 7/4817 |
| 10,557,922 B2 * | 2/2020 | Popescu ................ | G01S 7/4813 |
| 10,788,572 B2 * | 9/2020 | Hartmann .............. | G01S 17/42 |

(Continued)

FOREIGN PATENT DOCUMENTS

| | | |
|---|---|---|
| JP | H08334724 A | 12/1996 |
| JP | 2015-210098 A | 11/2015 |

*Primary Examiner* — Christopher Stanford
(74) *Attorney, Agent, or Firm* — Maschoff Brennan

(57) ABSTRACT

In a ranging device, a mirror support has a pair of deflection mirrors installed on both surfaces. A pair of partition plates are installed to bookend the pair of deflection mirrors and the mirror support in a direction normal to the reflective surfaces of the deflection mirrors. A clip grips and secures the pair of deflection mirrors, the mirror support, and the pair of partition plates. A motor rotates these components. Each partition plate includes a plate-like portion extending along a plane normal to the axis of rotation so as to partition a corresponding reflective surface into two regions, and an upright portion extending along the corresponding reflective surface from a position on the plate-like portion where the plate-like portion faces the corresponding reflective surface. The clip grips the pair of deflection mirrors and the mirror support via the upright portion in the direction normal to the reflective surfaces.

7 Claims, 7 Drawing Sheets

(56) References Cited

U.S. PATENT DOCUMENTS

2001/0035946 A1* 11/2001 Nakase .................. G01S 17/42
356/4.01
2017/0350966 A1    12/2017 Hartmann et al.

* cited by examiner

RANGING DEVICE

CROSS-REFERENCE TO RELATED APPLICATION

This application is a continuation application of International Application No. PCT/JP2020/022907 filed Jun. 10, 2020 which designated the U.S. and claims priority to Japanese Patent Application No. 2019-108653 filed with the Japan Patent Office on Jun. 11, 2019, the contents of each of which are incorporated herein by reference.

BACKGROUND

Technical Field

The present disclosure relates to a ranging device including deflection mirrors.

Related Art

Existing ranging devices are configured to emit transmission waves, detect reflected waves of the emitted transmission waves from an object, and thereby measure a distance to the object. In such ranging devices, a rotationally driven deflection mirror is used, and the transmission waves output from a transmitter are reflected by the deflection mirror and projected in a direction corresponding to a rotation angle of the deflection mirror, thereby scanning a predefined scan region. The reflected waves from the object are reflected by the deflection mirror and detected at a receiver.

BRIEF DESCRIPTION OF THE DRAWINGS

In the accompanying drawings.

DESCRIPTION OF SPECIFIC EMBODIMENTS

Figure 1:
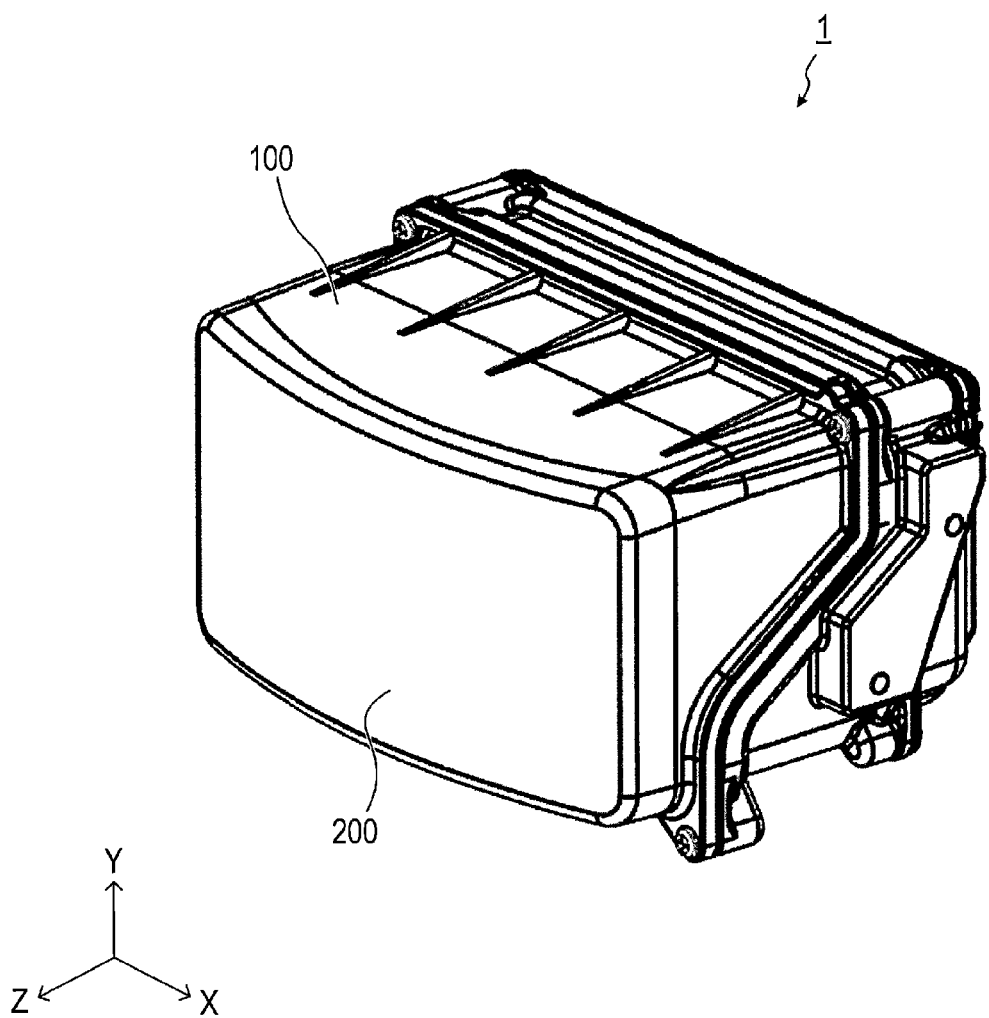
FIG. 1 is a perspective view of a LiDAR device.

A deflection mirror arrangement for a LiDAR device for deflecting and projecting light is known, as disclosed in U.S. Pat. No. 10,788,572. This deflection mirror arrangement includes a pair of deflection mirrors and a mirror support, wherein the pair of deflection mirrors are installed on the mirror support on opposite sides of the mirror support. In this deflection mirror arrangement, as transmission beams and reflected beams are deflected using the same deflection mirrors, a separating wall, which is a partition plate for inhibiting shorting between the transmitter side and the receiver side, is provided on reflective surfaces of the deflection mirrors. The separating wall has a rectilinear edge section, which is an edge section facing the reflective surface of each deflection mirror, and a fastening web formed at both ends of the rectilinear edge section, and is engaged to each deflection mirror via the rectilinear edge section and fastened to the mirror support at the fastening web.

In the technique described in U.S. Pat. No. 10,788,572, when installing the partition plate on the pair of deflection mirrors and the mirror support, it is necessary to engage the partition plate to each deflection mirror via the rectilinear edge section and to screw the fixing web to the mirror support. However, as a result of detailed research performed by the present inventors, an issue has been found that the partition plate is not readily assembled in such an installation method.

In view of the foregoing, it is desired to have a technique for readily assembling the partition plate to the pair of deflection mirrors and the mirror support.

One aspect of the present disclosure provides a ranging device including a pair of deflection mirrors, a mirror support, a pair of partition plates, a clip, and a motor. The mirror support is a plate member having a shape in conformity with a shape of reflective surfaces of the pair of deflection mirrors, with the pair of deflection mirrors installed on both surfaces of the mirror support. The pair of partition plates are installed to horizontally bookend the pair of deflection mirrors and the mirror support in a direction normal to the reflective surfaces of the pair of deflection mirrors. The clip grips and secures the pair of deflection mirrors, the mirror support, and the pair of partition plates. The motor rotates the pair of deflection mirrors, the mirror support, the pair of partition plates, and the clips. Each of the pair of partition plates includes a plate-like portion and an upright portion. The plate-like portion extends along a plane normal to the axis of rotation so as to partition a corresponding one of the reflective surfaces into two regions. The upright portion extends along the corresponding reflective surface from a position on the plate-like portion where the plate-like portion faces the corresponding reflective surface. The clip grips the pair of deflection mirrors and the mirror support via the upright portion in the direction normal to the reflective surfaces.

This configuration facilitates assembling of the pair of partition plates to the pair of deflection mirrors and the mirror support.

Hereinafter, some exemplary embodiments of the disclosure will be described with reference to the drawings.

1. Configuration

A LiDAR device 1 illustrated in FIG. 1 is a ranging device that measures a distance to an object by emitting light and receiving its reflected light. The LiDAR device 1 is installed to a vehicle and used for detecting various objects present ahead of the vehicle. LiDAR is an abbreviation for light detection and ranging.

The LiDAR device 1, as illustrated in FIG. 1, includes a housing 100 and an optical window 200. The housing 100 is a rectangular resin box with an opening in one of its six surfaces.

Hereinafter, the direction along the length of the substantially rectangular opening is referred to as the X axis direction, the direction along the width of the opening is referred to as the Y axis direction, and the direction normal to the X axis direction and the Y axis direction is referred to as the Z axis direction. Right and left in the X axis direction, and up and down in the Y axis direction are defined as viewed from the opening in the housing 100 with the LiDAR device 1 installed to the vehicle such that the X-Z plane is horizontal. In the Z axis direction, forward is defined as a direction from the depth toward the opening in the housing 100, and rearward is defined as a direction toward the depth.

Figure 2:
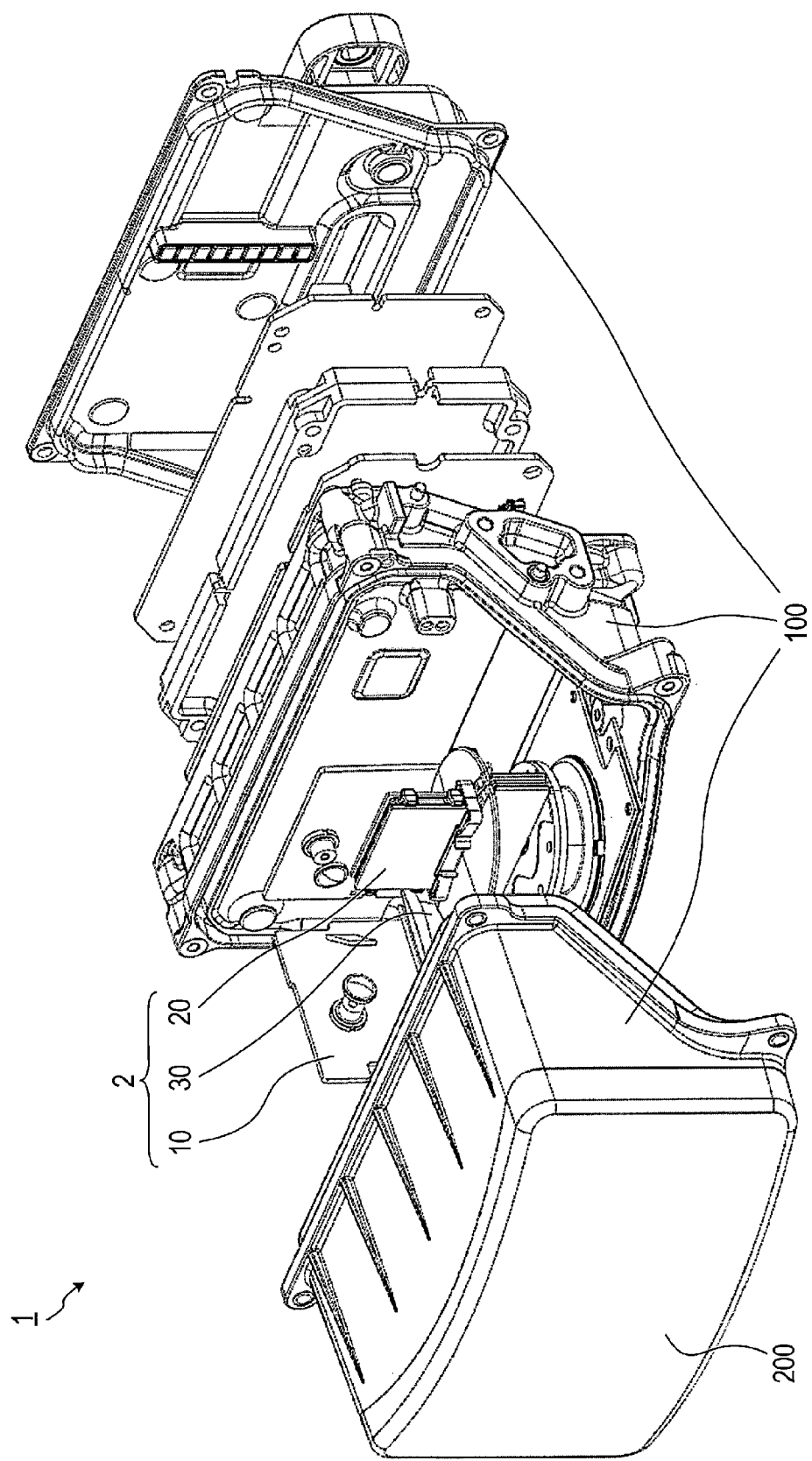
FIG. 2 is an exploded perspective view of the LiDAR device.

As illustrated in FIG. 2, a photodetection module 2 is housed within the housing 100. The photodetection module 2 includes a light projecting unit 10, a scanning unit 20, and a light receiving unit 30.

2. Scanning Unit

Figure 3:
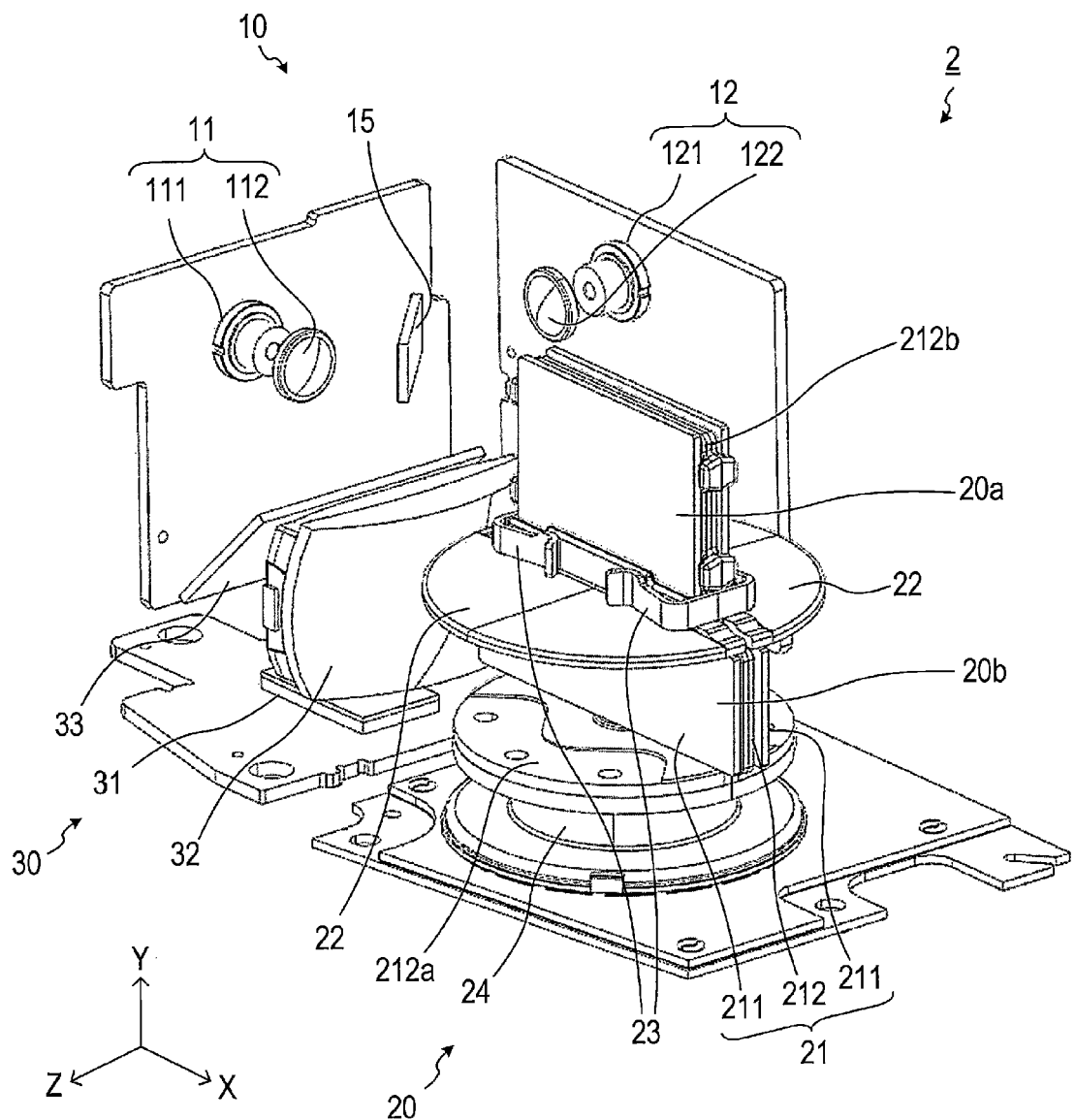
FIG. 3 is a perspective view of a photodetection module housed in a housing of the LiDAR device.
Figure 4:
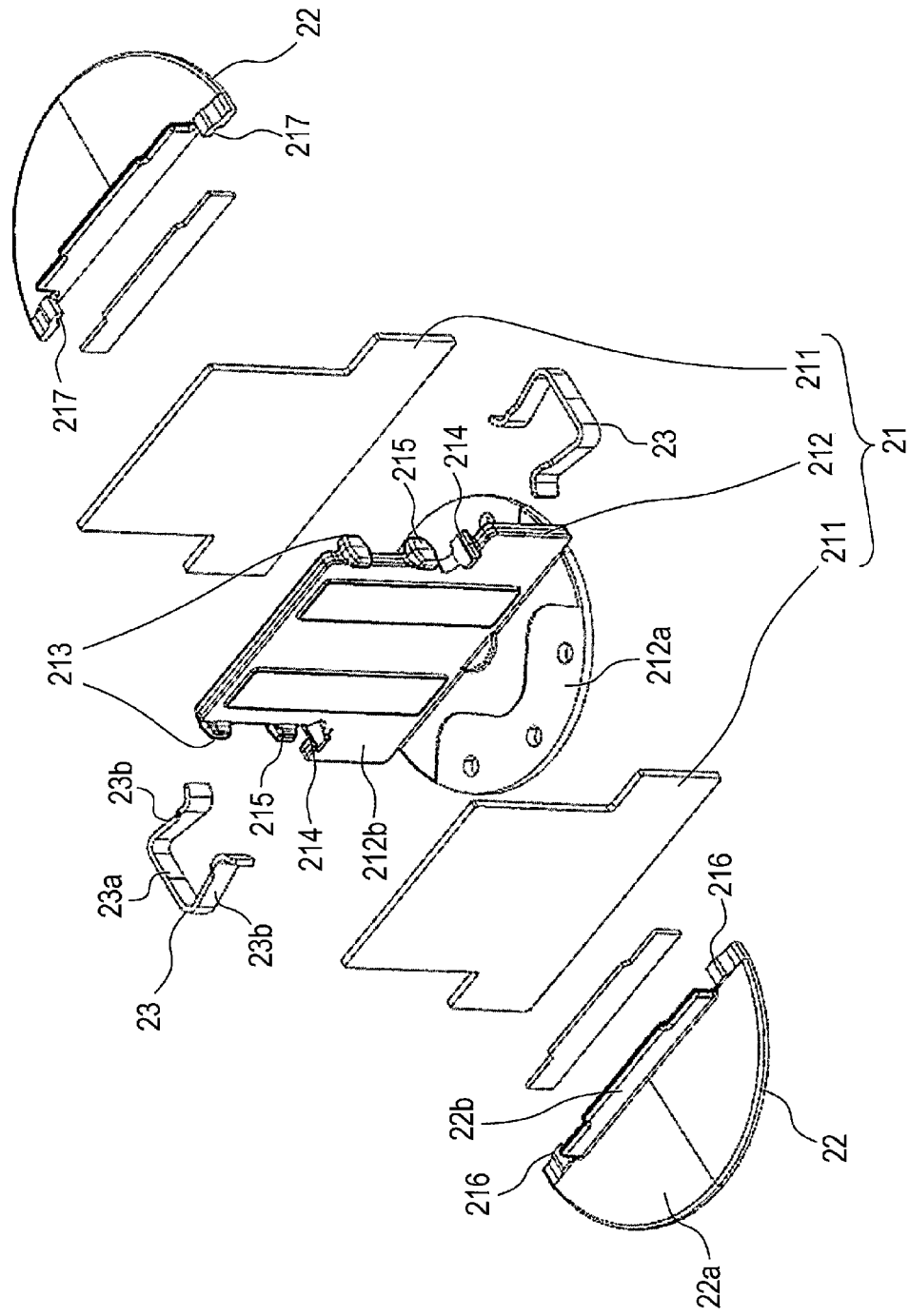
FIG. 4 is an exploded perspective view of a mirror module, partition plates, and clips in a scanning unit.

As illustrated in FIGS. 3 and 4, the scanning unit 20 includes a mirror module 21, a pair of partition plates 22, clips 23, and a motor 24. The pair of partition plates 22 are fixed to the mirror module 21 by the clips 23. The mirror module 21 stands on the motor 24. The mirror module 21, the pair of partition plates 22, and the clips 23 are driven by the motor 24 to rotate around the axis of rotation illustrated by the dashed-dotted line in FIG. 6.

3. Mirror Module, Partition Plates, and Clips

The mirror module 21 includes a pair of deflection mirrors 211 and a mirror support 212.

The pair of deflection mirrors 211 are flat-plate-like portions each having a reflective surface that reflects light.

The mirror support 212 includes a disk member 212a and an installation member 212b. The disk member 212a is a circular and plate-like part, the center of which is fixed to the axis of rotation of the motor 24. The installation member 212b is a plate-like part, on both surfaces of which the deflection mirrors 211 are installed, and is upright on the circular surface of the disk member 212a.

The pair of deflection mirrors 211 each have an integrated shape of two rectangles with different lengths. More specifically, each of the deflection mirrors 211 has an integrated shape of a first and a second rectangle arranged along their central axes extending in the width direction, with the axes aligned with each other. Hereinafter, in the pair of deflection mirrors 211, the rectangular portion corresponding to the first rectangle is referred to as a narrower portion, and the rectangular portion corresponding to the second rectangle is referred to as a wider portion.

The shape of surfaces of the installation member 212b, on which the pair of deflection mirrors 211 are installed, conforms to the shape of the pair of deflection mirrors 211.

Figure 5A:
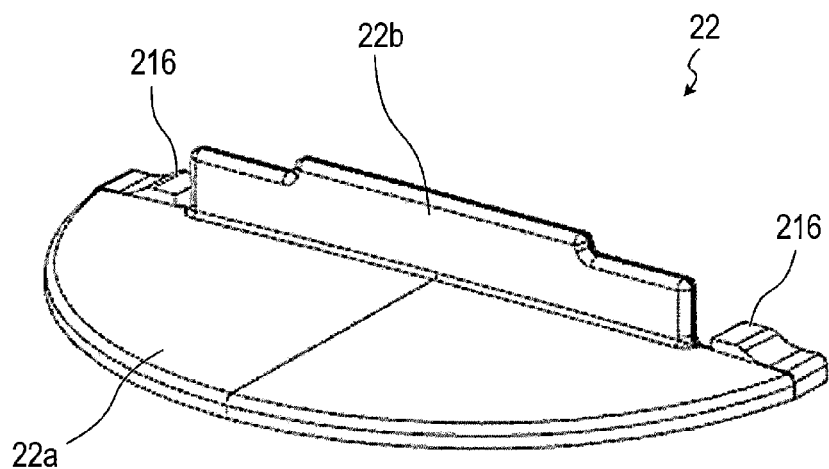
FIG. 5A is a front perspective view of the partition plate.
Figure 5B:
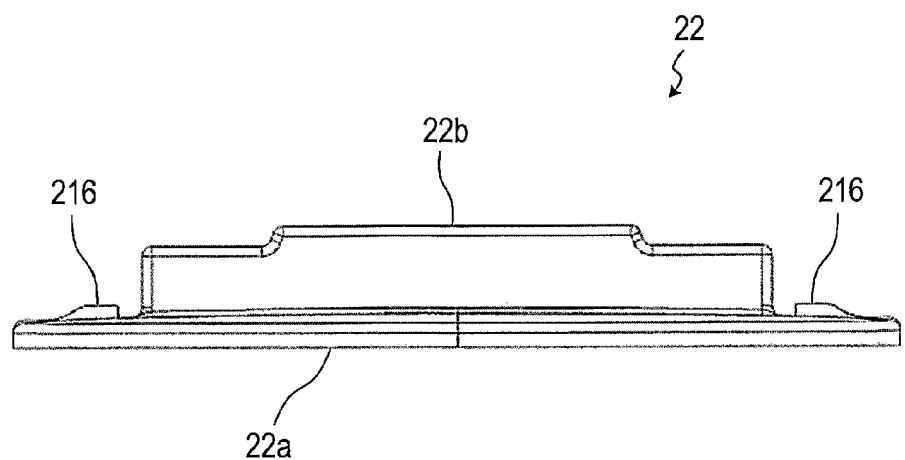
FIG. 5B is a side view of the partition plate.
Figure 5C:
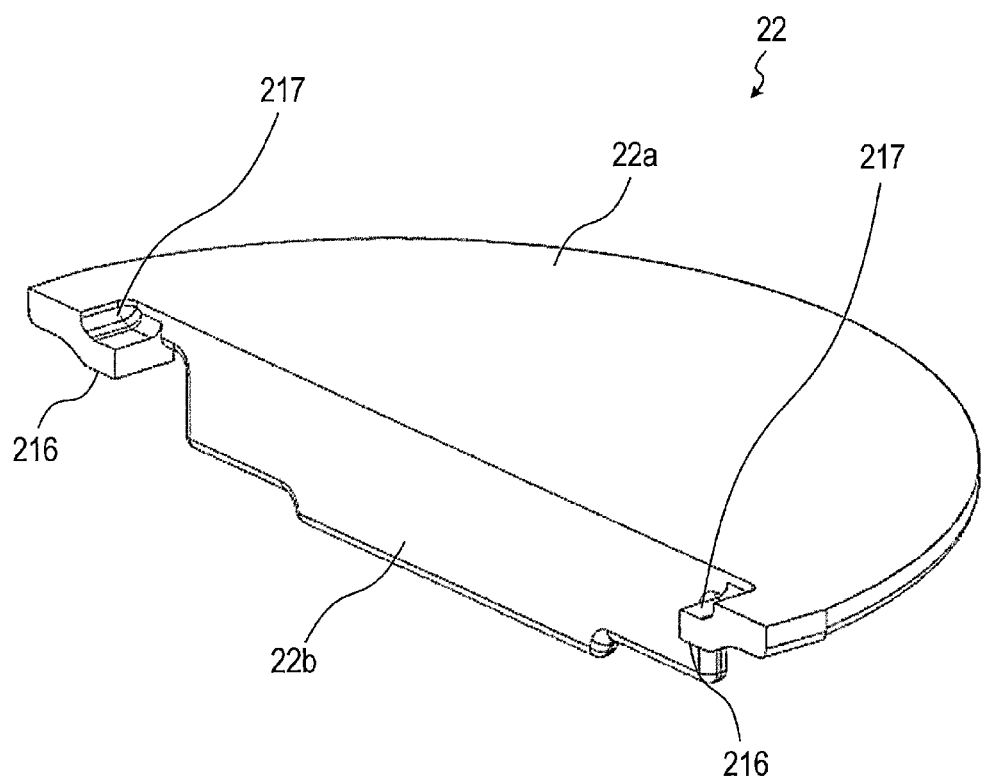
FIG. 5C is a back perspective view of the partition plate.
Figure 6:
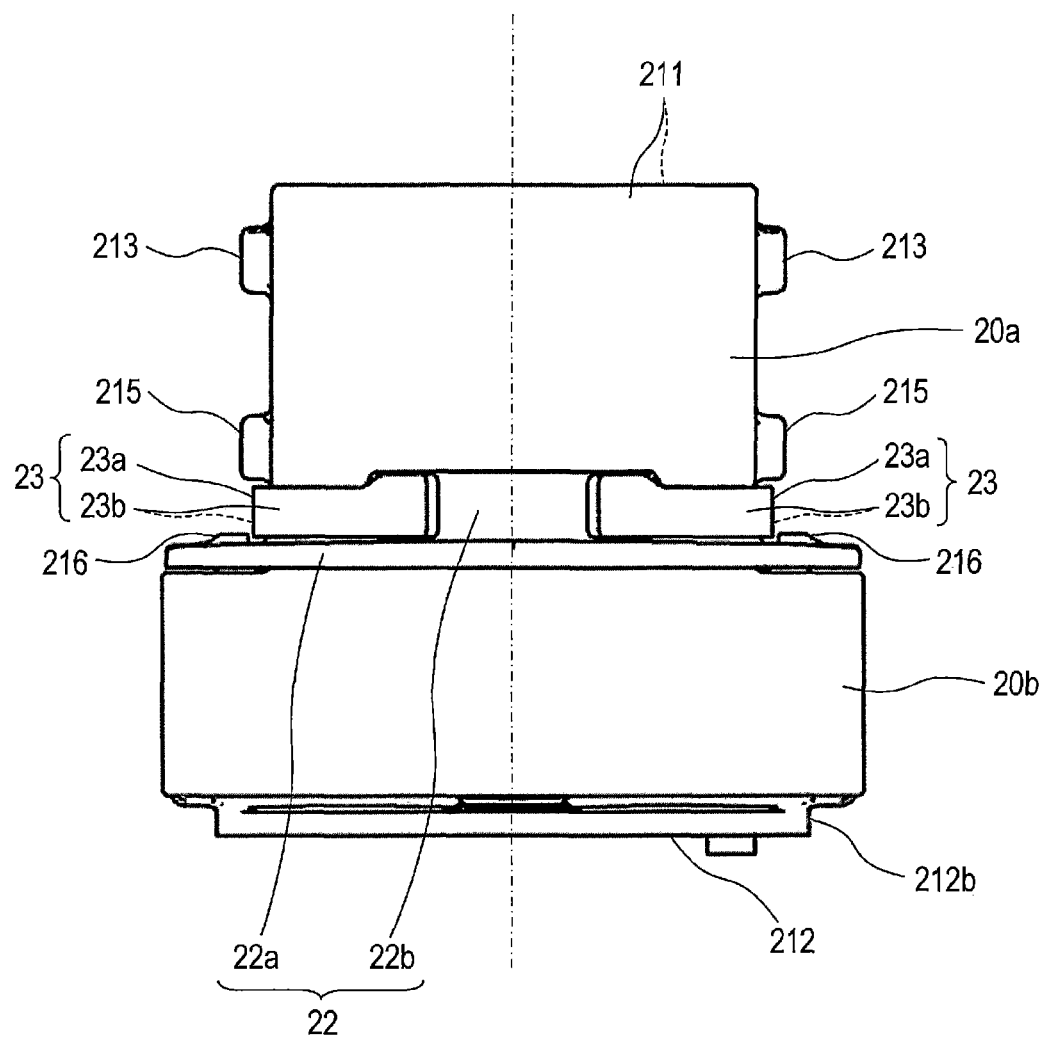
FIG. 6 is a view of the mirror module, the partition plates, and the clips in the scanning unit as viewed from a reflective surface of the deflection mirror.

As illustrated in FIGS. 4-6, the pair of partition plates 22 are two semicircular portions forming together a circular and plate-like member having a diameter equal to the length of the wider portion of each of the pair of deflection mirrors 211. The pair of partition plates 22 horizontally bookend the pair of deflection mirrors 211 in a direction normal to the reflective surfaces of the pair of deflection mirrors 211 and are thereby fixed to the mirror module 21.

Each partition plate 22 includes a plate-like portion 22a and an upright portion 22b. The plate-like portion 22a is a semicircular plate-like portion and is positioned along a plane normal to the axis of rotation so as to partition the reflective surface of the deflection mirror 211 into two regions, that is, the narrower portion and the wider portion.

The upright portion 22b is a portion extending along the reflective surface from a position on the plate-like portion 22a where the plate-like portion 22a faces the reflective surface of the deflection mirror 211. Hereafter, the surface of the plate-like portion 22a with the upright portion 22b is referred to as a front surface as illustrated in FIG. 5A, and the surface of the plate-like portion 22a without the upright portion 22b is referred to as a back surface as illustrated in FIG. 5C.

As illustrated in FIG. 4, each clip 23 is U-shaped and includes a base portion 23a and a pair of gripping portions 23b extending from the base portion 23a. As illustrated in FIG. 6, the pair of clips 23 grip, with their respective pairs of gripping portions 23b, the pair of deflection mirrors 211 and the mirror support 212 via the upright portions 22b, at both ends of the narrower portion of each deflection mirror 211 in the direction normal to the axis of rotation. The pair of partition plates 22 are thereby fixed to the mirror module 21.

In a state where the pair of partition plates 22 are fixed to the mirror module 21, portions of each plate-like portion 22a are positioned on side surfaces of the installation member 212b that form steps between the narrower and wider portions. Specifically, these side surfaces of the installation member 212b are side surfaces of the wider portion of the installation member 212b that are normal to the axis of rotation and continuous with side surfaces of the narrower portion of the installation member 212b. Both ends of a portion of the plate-like portion 22a where the upright portion 22b is formed are positioned on such side surfaces.

Hereinafter, the upper part of the pair of deflection mirrors 211 relative to the pair of partition plates 22, i.e., on the narrower portion side, is referred to as an emitted light deflector 20a, and the lower part of the pair of deflection mirrors 211 relative to the pair of partition plates 22, i.e., on the wider portion side, is referred to as a received light deflector 20b.

As illustrated in FIGS. 4 and 6, the installation member 212b of the mirror support 212 includes a pair of mirror restraints 213, a pair of protrusions 214, and a pair of guides 215. The pair of mirror restraints 213 and the pair of guides 215 are formed on both side surfaces, across the axis of rotation, of the narrower portion of the installation member 212b. The pair of protrusions 214 are formed on the side surfaces of the installation member 212b forming the steps between the narrower portion and the wider portion.

Each partition plate 22 includes a pair of clip restraints 216 and a pair of recesses 217. As illustrated in FIGS. 5A and 5B, the pair of clip restraints 216 are formed on the front surface of the plate-like portion 22a. As illustrated in FIG. 5C, the pair of recesses 217 are formed on the back surface of the plate-like portion 22a.

The pair of clip restraints 216 are protrusions positioned farther from the axis of rotation than the position of the base portion 23a of the clip 23 on the front surface of the plate-like portion 22a, as illustrated in FIG. 6. Each pair of clip restraints 216 contact a corresponding one of the clips 23 such that the base 23a is sandwiched between the pair of clip restraints 216 and the mirror module 21, thereby restricting movement of the clips 23 in a direction normal to the axis of rotation on the reflective surfaces.

The pair of mirror restraints 213, as illustrated in FIG. 4, are protrusions protruding toward the pair of deflection mirrors 211 from both side surfaces, across the axis of rotation, of the narrower portion of the installation member 212b. As illustrated in FIG. 6, the pair of mirror restraints 213 contact the pair of deflection mirrors 211 at both sides of the narrower portion of the installation member 212b in the direction normal to the axis of rotation, and thereby restrict movement of the pair of deflection mirrors 211 in the direction normal to the axis of rotation on the reflective surfaces.

The pair of protrusions 214, as illustrated in FIG. 4, are protrusions protruding toward both of the pair of deflection mirrors 211 from the side surfaces of the installation member 212b forming the steps between the narrower and wider portions of the installation member 212b. The pair of protrusions 214 contact the deflection mirrors 211 at side surfaces forming the steps between the narrower and wider portions of the deflection mirrors 211, and thereby restrict movement of the pair of deflection mirrors 211 in a direction from the wider portion to the narrower portion, that is, in the upward direction.

The pair of recesses 217 are formed on the back surface of each plate-like portion 22a at positions facing the pair of protrusions 214 of the mirror support 212. Engagement of the pair of recesses 217 with the pair of protrusions 214 restricts movement of the partition plate 22.

The pair of guides 215 are protrusions protruding toward the pair of deflection mirrors 211 from both side surfaces, across the axis of rotation, of the narrower portion of the installation member 212b, and are positioned below the pair of mirror restraints 213. As illustrated in FIG. 6, the pair of guides 215 contact the pair of deflection mirrors 211 at both sides of the narrower portion of the installation member 212b in the direction normal to the axis of rotation, and thereby restrict movement of the pair of deflection mirrors 211 in the direction normal to the axis of rotation on the reflective surfaces. Further, the pair of guides 215 contact the respectively corresponding clips 23 so as to sandwich the clips 23 with the plate-like portions 22a, and thereby restrict movement of the clips 23 in a direction parallel to the axis of rotation.

4. Light Projecting Unit

As illustrated in FIG. 3, the light projecting unit 10 includes a pair of light emitting modules 11, 12. The light projecting unit 10 may include an emitted-light fold mirror 15.

The light emitting module 11 includes a light source 111 and an emission lens 112, both of which are disposed facing each other. A semiconductor laser is used as the light source 111. The emission lens 112 is a lens that narrows the beam width of light emitted from the light source 111. Similarly, the light emitting module 12 includes a light source 121 and an emission lens 122. Since the light emitting module 12 is similar to the light emitting module 11, description thereof will be omitted.

The emitted-light fold mirror 15 is a mirror that changes the direction of travel of light.

The light emitting module 11 is arranged such that light output from the light emitting module 11 is directly incident on the emitted light deflector 20a.

The light emitting module 12 is arranged such that the direction of travel of light output from the light emitting module 12 is deflected substantially 90 degrees by the emitted-light fold mirror 15 and then the light is incident on the emitted light deflector 20a.

Here, the light emitting module 11 is arranged to output light from left to right in the X-axis direction, and the light emitting module 12 is arranged to output light from rear to front in the Z-axis direction. The emitted-light fold mirror 15 is arranged so as not to block the path of the light from the light emitting module 11 to the emitted light deflector 20a.

5. Light Receiving Unit

The light receiving unit 30 includes a light receiving element 31. The light receiving unit 30 may include a light receiving lens 32 and a received-light fold mirror 33.

The light receiving element 31 includes an APD array in which a plurality of APDs are arranged in a row. Each APD is an avalanche photodiode.

The light receiving lens 32 is a lens that focuses the light arriving from the received light deflector 20b.

The received-light fold mirror 33 is disposed on the left side of the light-receiving lens 32 in the X-axis direction and configured to change the direction of travel of light. The light receiving element 31 is disposed below the received-light fold mirror 33.

The received-light fold mirror 33 is arranged to bend the optical path substantially 90 degrees downward such that light incident from the received light deflector 20b via the light receiving lens 32 reaches the light receiving element 31.

The light receiving lens 32 is disposed between the received light deflector 20b and the received-light fold mirror 33. The light receiving lens 32 narrows the light beam incident on the light receiving element 31 such that the beam diameter is about the element width of the APD.

6. Operation of the Photodetection Module

The light output from the light emitting module 11 is incident on the emitted light deflector 20a. The light output from the light emitting module 12 is incident on the emitted light deflector 20a after the direction of travel is bent by 90 degrees at the emitted-light fold mirror 15. The light incident on the emitted light deflector 20a is emitted through the optical window 200 in a direction corresponding to the rotation angle of the mirror module 21. A region irradiated with the light via the mirror module 21 corresponds to a scanning range. For example, given that the forward direction along the Z-axis is at 0 degrees, the scanning range may be a range of −60 to +60 degrees that spreads along the X-axis direction.

The light reflected from a subject positioned in a specific direction in accordance with a rotational position of the mirror module 21, i.e., in a direction in which light is emitted from the emitted light deflector 20a, passes through the optical window 200 and is reflected by the received light deflector 20b. The reflected light is received by the light receiving element 31 via the light receiving lens 32 and the received light fold mirror 33.

7. Advantages

The present embodiment described in detail above can provide the following advantages.

(7a) In the LiDAR device 1, the pair of partition plates 22 are fixed to the mirror module 21 by the pair of clips 23 gripping the pair of deflection mirrors 211 and the mirror support 212 via the upright portions 22b. With this configuration, the partition plates 22 can be readily assembled to the pair of deflection mirrors 211 and the mirror support 212 by simply gripping the pair of deflection mirrors 211, the mirror support 212, and the pair of partition plates 22 with the clips 23.

(7b) In the LiDAR device 1, the pair of partition plates 22 include the clip restraints 216. Each clip restraint 216 is a protrusion extending from a position farther from the axis of rotation than the position of the base 23a of the clip 23 on the plate-like portion 22a, and restricts movement of the clip 23 in a direction normal to the axis of rotation on the reflective surfaces. This prevents the clips 23 from shifting in a direction normal to the axis of rotation on the reflective surfaces during assembling of the partition plates 22 to the mirror module 21 with the clips 23, thereby improving the assembling accuracy.

(7c) In the LiDAR device 1, the mirror support 212 includes the pair of mirror restraints 213. The pair of mirror restraints 213 are protrusions protruding toward the pair of deflection mirrors 211 from both side surfaces, across the axis of rotation, of the narrower portion of the installation member 212b, and restrict movement of the pair of deflection mirrors 211 in the direction normal to the axis of rotation on the reflective surfaces. This prevents the pair of deflection mirrors 211 from shifting in the direction normal to the axis of rotation on the reflective surfaces, thereby improving the assembling accuracy and facilitating assembling.

(7d) In the LiDAR device 1, there are portions of each plate-like portion 22a of the partition plate 22 disposed on the side surfaces of the installation member 212b of the mirror support 212 that form steps between the narrower portion and the wider portion of the installation member 212b. This configuration allows, during assembling of the partition plate 22 to the mirror module 21, the partition plate 22 to be positioned to partition the reflective surface of each deflection mirror 211 into two regions, that is, the narrower portion and the wider portion, thereby further facilitating assembling.

(7e) In the LiDAR device 1, the mirror support 212 includes the pair of protrusions 214. The pair of protrusions 214 are protrusions protruding toward both of the pair of deflection mirrors 211 from the side surfaces of the installation member 212b forming the steps between the narrower and wider portions of the installation member 212b. The pair of protrusions 214 restrict movement of the pair of deflection mirrors 211 in the direction from the wider portion to the narrower portion, that is, in the upward direction. This configuration prevents the pair of deflection mirrors 211 from shifting in the direction from the wider portion to the narrower portion, i.e., in the upward direction, thereby improving the assembling accuracy and further facilitating assembling.

(7f) In the LiDAR device 1, the pair of partition plates 22 have the pair of recesses 217 formed on the back surface of each plate-like portion 22a at positions facing the pair of protrusions 214 of the mirror support 212. Engagement of the pair of recesses 217 with the pair of protrusions 214 restricts movement of the partition plate 22. This configuration prevents the partition plate 22 from shifting in the direction normal to the axis of rotation during assembling of the partition plate 22 to the mirror module 21, thereby improving the assembling accuracy and facilitating assembling.

(7g) In the LiDAR device 1, the mirror support 212 includes the pair of guides 215. The pair of guides 215 are protrusions protruding toward the pair of deflection mirrors 211 from both side surfaces, across the axis of rotation, of the narrower portion of the installation member 212b, and are positioned below the pair of mirror restraints 213. The pair of guides 215 restrict movement of the pair of deflection mirrors 211 in the direction normal to the axis of rotation on the reflective surfaces. This configuration prevents the pair of deflection mirrors 211 from shifting in the direction normal to the axis of rotation on the reflective surfaces, thereby improving the assembling accuracy and facilitating assembling. Further, the pair of guides 215 contact the respectively corresponding clips 23 so as to sandwich the clips 23 with the plate-like portions 22a, and thereby restrict movement of the clips 23 in a direction parallel to the axis of rotation. This can prevent the clips 23 from shifting in the direction parallel to the axis of rotation during assembling of the partition plate 22 to the mirror module 21 with the clips 23, thereby improving the assembling accuracy.

8. Other Embodiments

While the specific embodiment of the present disclosure has been described above, the present disclosure is not limited to the above-described embodiment, and may incorporate various modifications.

(8a) In the above embodiment, the pair of deflection mirrors 211, the mirror support 212, and the pair of partition plates 22 are gripped by the pair of clips 23 at both ends of the narrower portion of each of the pair of deflection mirrors 211 in the direction normal to the axis of rotation, but the present disclosure is not limited to this embodiment. For example, the pair of deflection mirrors 211, the mirror support 212, and the pair of partition plates 22 may be gripped by only one clip at one end. In this case, the clip restraints 216 may be formed on the plate-like portions 22a only on the side where the clip is provided.

(8b) In the above embodiment, each plate-like portion 22a is a semicircular plate having the same diameter as the length of the wider portion of each of the pair of deflection mirrors 211, but the shape of the plate-like portion 22a is not limited thereto. For example, each plate-like portion 22a may be a square plate or the like. Each plate-like portion 22a may extend outwardly beyond the length of the wider portion of each of the pair of deflection mirrors 211.

(8c) In the above embodiment, the installation member 212b of the mirror support 212 includes only one pair of mirror restraints 213, but the number of mirror restraints 213 is not limited thereto. For example, the installation member 212b may include two or more pairs of mirror restraints 213.

(8d) In the above-described embodiment, the installation member 212b of the mirror support 212 includes one pair of protrusions 214, and one pair of recesses 217 for engaging the one pair of protrusions 214 are formed in the partition plate 22, but the number of protrusions 214 and the number of recesses 217 are not limited thereto. For example, the installation member 212b of the mirror support 212 may include only one protrusion 214, and one recess 217 for engaging the protrusion 214 may be formed in the partition plate 22.

(8e) In the above embodiments, the LiDAR device 1 is illustrated as a ranging device, but the type of the ranging device is not limited thereto. For example, the ranging device may be a millimeter wave radar device or the like.

(8f) The functions of a single component may be distributed to a plurality of components, or the functions of a plurality of components may be consolidated into a single component. At least part of the configuration of the above embodiments may be removed. At least part of the configuration of one of the above embodiments may be replaced with or added to the configuration of another one of the above embodiments.

What is claimed is:
1. A ranging device comprising:
a pair of deflection mirrors;
a mirror support that is a plate member having a shape in conformity with a shape of reflective surfaces of the pair of deflection mirrors, with the pair of deflection mirrors installed on both surfaces of the mirror support;

a pair of partition plates installed to horizontally bookend the pair of deflection mirrors and the mirror support in a direction normal to the reflective surfaces of the pair of deflection mirrors;

a clip that grips and secures the pair of deflection mirrors, the mirror support, and the pair of partition plates; and a motor that rotates the pair of deflection mirrors, the mirror support, the pair of partition plates, and the clips, wherein each of the pair of partition plates includes a plate-like portion extending along a plane normal to the axis of rotation so as to partition a corresponding one of the reflective surfaces into two regions, and an upright portion extending along the corresponding reflective surface from a position on the plate-like portion where the plate-like portion faces the corresponding reflective surface, and the clip grips the pair of deflection mirrors and the mirror support via the upright portion in the direction normal to the reflective surfaces.

2. The ranging device according to claim 1, wherein the clip is U-shaped and includes a base portion and a pair of gripping portions extending from the base portion, and the clip gripping, with the gripping portions, the pair of deflection mirrors and the mirror support via the upright portions, at one end of the mirror support in a direction normal to the axis of rotation, and each of the pair of partition plates includes a clip restraint that is a protrusion extending from a position farther from the axis of rotation than a position of the base portion of the clip on the plate-like portion, and restricts movement of the clip in the direction normal to the axis of rotation on the reflective surfaces.

3. The ranging device according to claim 1, wherein the mirror support includes a pair of mirror restraints that are protrusions protruding toward the pair of deflection mirrors from both ends of the mirror support in the direction normal to the axis of rotation, and restrict movement of the pair of deflection mirrors in the direction normal to the axis of rotation on the reflective surfaces.

4. The ranging device according to claim 1, wherein each of the pair of deflection mirrors includes a narrower portion and a wider portion, a width of the reflective surface of the narrower portion along the direction normal to the axis of rotation being less than a width of the reflective surface of the wider portion along the direction normal to the axis of rotation, the narrower portion being formed on either one of sides of the reflective surface in a direction parallel to the axis of rotation, and the pair of partition plates are arranged to partition the reflective surfaces of the respective deflection mirrors into the narrower and wider portions, and a portion of the plate-like portion of each of the pair of partition plates is disposed on a side surface of the mirror support that forms a step between narrower and wider portions of the mirror support respectively corresponding to the narrower and wider portions of each of the deflection mirrors.

5. The ranging device according to claim 4, wherein the mirror support includes a protrusion that protrudes toward both of the pair of deflection mirrors from the side surface forming the step between the narrower and wider portion of the mirror support and restricts movement of the pair of deflection mirrors in a direction from the wider portion to the narrower portion.

6. The ranging device according to claim 5, wherein each of the pair of partition plates has a recess formed at a position on the plate-like portion facing the protrusion formed on the mirror support so as to engage the protrusion.

7. The ranging device according to claim 4, wherein the mirror support includes a pair of guides that are protrusions protruding toward the pair of deflection mirrors from both ends of a portion of the mirror support corresponding to the narrower portion in the direction normal to the axis of rotation and restrict movement of the pair of deflection mirrors in the direction normal to the axis of rotation on the reflective surfaces, and the clip is sandwiched between one of the pair of guides and the plate-like portion, and movement of the clip in the direction parallel to the axis of rotation axis is thereby restricted.

* * * * *